United States Patent

Melnyk

[15] 3,702,467
[45] Nov. 7, 1972

[54] SHAFT POSITION SENSING DEVICE

[72] Inventor: George Melnyk, Endicott, N.Y.

[73] Assignee: International Business Machines Corporation, Armonk, N.Y.

[22] Filed: Nov. 23, 1971

[21] Appl. No.: 201,281

[52] U.S. Cl............... 340/200, 340/271, 340/347 P, 317/253
[51] Int. Cl. .............................................G08c 19/16
[58] Field of Search ...340/200, 347 P, 271; 317/253; 324/61 R; 318/662

[56] References Cited

UNITED STATES PATENTS

| 2,604,512 | 7/1952 | Bacon et al................340/200 |
| 3,421,059 | 1/1969 | Takahashi.................318/662 |
| 3,221,256 | 11/1965 | Walden.........................328/1 |
| 3,142,795 | 7/1964 | Greeley.......................323/93 |

OTHER PUBLICATIONS

E. W. Pappenfus et al.– " Single Sideband Principles & Circuits," Chap. 18, pp. 296– 297, McGraw– Hill 1964.

Primary Examiner—John W. Caldwell
Assistant Examiner—Robert J. Mooney
Attorney—J. Jancin, Jr. et al.

[57] ABSTRACT

A shaft position sensing device provides a non-velocity sensitive, low noise output signal substantially free of any AC component. In one embodiment, a differential variable capacitor, constructed such that no commutation or slip-rings are necessary, is mounted to change capacitance with shaft rotation. This capacitor modulates a pair of AC signals which are 180° out of phase. For detection, the pair of modulated AC signals are applied to a ring demodulator circuit which provides, at a balanced output, a signal indicative of shaft position and substantially free of any AC component. The zero crossings and peaks of this signal, as well as its amplitude and polarity are indicative of shaft position.

6 Claims, 7 Drawing Figures

PATENTED NOV 7 1972    3,702,467

SHAFT POSITION SENSING DEVICE

BACKGROUND OF THE INVENTION

1. Field of the Invention

This invention relates generally to angular position sensing instruments and more particularly to shaft position sensing instruments in which the particular position measuring instrument is a variable capacitor.

2. Prior Art

Shaft position sensing devices generally contain a position transducer responsive to shaft position and detection circuitry for converting a signal from the position transducer to a signal indicative of shaft position. Devices of this type are known in which a variable capacitor is used for the position transducer. In such a device, the transducer may be characterized as a capacitive transducer.

Various combinations of capacitive transducers and detecting circuitry have been heretofore proposed for angular position measuring. In one such combination, the capacitive transducer comprises a pair of electric plates having radially extending conductive patterns disposed thereon. The first plate is fixedly mounted while the second plate is mounted parallel to the first plate on a rotating shaft. In order to provide electrical contact with the conductive bands disposed on the second, rotating plate some type of commutation is necessary which usually takes the form of a slip-ring and a fixed contact. Because a slip-ring and a fixed contact never assure continual electrical contact, some degree of noise is always inherent. Furthermore, frictional drag is added to the rotating system by the slip-ring and fixed contact.

Another problem with prior art angular position measuring devices is found in their detection circuitry. For the sake of simplicity, low cost, and reliability, it is often desirable to have detection circuitry comprising a small number of passive components. Simple detecting circuitry comprising only passive components has been heretofore proposed, but because the output of such circuitry is usually referenced to ground, or single-ended, any noise in the system is amplified if the output signal is amplified.

OBJECTS OF THE INVENTION

An object of this invention is to sense shaft position in an improved manner.

Another object of this invention is sensing shaft position with reduced noise sensitivity.

A further object of this invention is sensing the position of rotatable member without adding frictional drag to the member.

Yet, another object of this invention is to sense shaft position and provide an output indicative of shaft position which is free from AC components.

SUMMARY OF THE INVENTION

The above and other objects are accomplished by providing a brushless, differential capacitive transducing means which changes capacitance with shaft rotation. First and second signals of equal amplitude but differing in phase by 180° are modulated in accordance with shaft position by the capacitive transducing means. A ring demodulating circuit has inputs for receiving the modulated first and second signals and provides, at a balanced output, a demodulated signal. At a constant angular velocity of the shaft, the demodulated signal has a substantially triangular waveform. The zero crossings and peaks of the waveform may be detected and counted. At any point in the rotation of the shaft, the magnitude and polarity of the waveform and the number of peaks and zero crossings through which the waveform has progressed from a reference point are indicative of shaft position.

Since this waveform is at all times directly proportional to shaft position, the waveform may be used to provide position data to a system for electronically detenting a DC motor. When used in such a system the waveform may be used, not only in determining whether or not a detent position has been reached, but also for determining how much farther the shaft must rotate to reach the detent position.

DESCRIPTION OF THE PREFERRED EMBODIMENT

Figure 1:
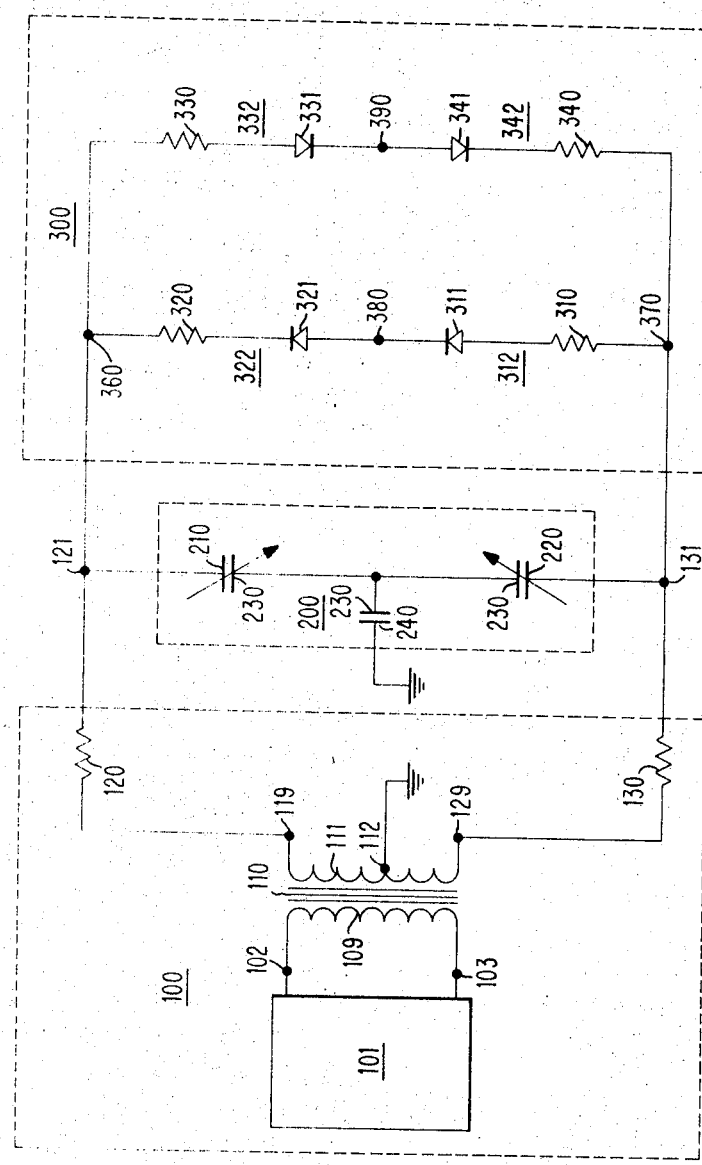
FIG. 1 is a schematic diagram of the preferred embodiment of the shaft position sensing device of this invention.

Referring now to FIG. 1, alternating current source means 100 has output terminals 121 and 131. Source means 100 includes an alternating current oscillator 101 having output terminals 102 and 103 connected to a primary winding 109 of transformer 110. It is, of course, recognized that an astable multivibrator, or the like, could be used as the oscillator 101. A secondary winding 111 of transformer 110 has a grounded center tap terminal 112 and terminals 119 and 129 at the ends of said winding 111. A resistor 120 is connected between terminal 119 and output terminal 121. Resistor 130 is connected between terminal 129 and output terminal 131. Resistors 120 and 130 have equal resistances so that the voltages, with respect to ground, at output terminals 121 and 131 will be equal insofar as the impedance of a load connected between output terminal 121 and ground is equal to the impedance of a load connected between output terminal 131 and ground. The voltages at output terminals 121 and 131 are substantially 180° out of phase with respect to each other, since they are derived from opposite ends of winding 111.

Output terminal 121 is connected to fixed plate 210 of differential capacitive transducing means 200. Output terminal 131 is connected to fixed plate 220 of transducing means 200. A fixed plate 240 of transducing means 200 is connected to ground. Moveable plate 230 cooperates with plates 210, 220, and 240 in the following manner. As plate 230 moves closer to plate 210, the capacitance between plates 230 and 210 increases. Likewise, as plate 230 moves closer to plate 220, the capacitance between plates 230 and 220 increases. Plates 210, 220, and 230 are arranged so that as plate 230 moves closer to plate 210, plate 230 moves farther away from plate 220. In a like manner, as plate 230 moves closer to plate 220, plate 230 moves farther away from plate 210. As the capacitance between plates 230 and 210 increases, the capacitance between plates 230 and 220 decreases. In the same manner as the capacitance between plates 230 and 220 increases, the capacitance between plates 230 and 210 decreases. At one point, in the movement of plate 230, the capacitance between plates 230 and 210 is equal to the capacitance between plates 230 and 220. Plate 230 is so constructed that regardless of its movement, the distance and the capacitance between plate 230 and plate 240 remains constant.

When plate 230 is at the position that the capacitance between plate 230 and plate 210 is equal to the capacitance between plates 230 and 220, the voltages at output terminals 121 and 131 will be equal with respect to ground and 180° out of phase with each other. If plate 230 moves closer to plate 210, the capacitance between plates 230 and 210 will be greater and a lower impedance load will be presented to output terminal 121. This lower impedance load at output terminal 121 will cause the voltage at output terminal 121 to be lower with respect to ground than it was when the capacitors were balanced. At the same time, this movement of plate 230 will cause plate 230 to be farther away from plate 220, resulting in a lower capacitance between plates 230 and 220. This lower capacitance between plates 230 and 220 results in a higher impedance load being connected between output terminal 131 and ground. Accordingly, the voltage with respect to ground at output terminal 131 will now be higher than it was when the capacitors were in a balanced position. It is now easily understood that movement of plate 230 modulates the output of source means 100 at its output terminals 121 and 131 in a complementary manner.

By complementary modulation, it is meant that, as the signal at output terminal 121 is made to increase in amplitude as plate 230 moves farther away from plate 210, the signal at output terminal 131 is made to decrease in amplitude as plate 230 moves closer to plate 220. Complementary modulation is also present as the signal at output terminal 121 is made to decrease in amplitude by a movement of plate 230 closer to plate 210, while the signal at output terminal 131 increases in amplitude as plate 230 moves farther away from plate 220. The signals at output terminals 121 and 131 also are said to be modulated in a complementary manner when plate 230 is equidistant from plates 210 and 220, thereby causing the amplitudes of the signals at output terminals 121 and 131 to be equal.

Opposite nodes 360 and 370 of ring demodulating detecting means 300 are connected to output terminals 121 and 131, respectively. Detecting means 300 includes a four arm ring demodulator circuit. Arm 312 includes diode 311 having its cathode connected to node 380 and its anode connected to node 370 through series resistor 310. Arm 322 includes diode 321 having its anode connected to node 380 and its cathode connected to node 360 through series resistor 320. Arm 332 includes diode 331 having its cathode connected to node 390 and its anode connected to node 360 through series resistor 330. Arm 342 includes diode 341 having its anode connected to node 390 and its cathode connected to node 370 through series resistor 340. It is recognized that resistors 320, 320, 330, and 340 can be connected at the opposite ends of the arms from the way which they are shown so long as they are in series with the diodes which are connected between nodes. It is also recognized that diodes 311, 321, 331, and 341 can be connected with reverse polarity from that shown, so long as the polarity of all of them is reversed from that shown and described. The important point is that diodes 311, 321, 331, and 341 must all be connected to pass current in the same direction around the ring formed by arms 312, 322, 332, and 342. Resistors 310, 320, 330, and 340 have equal resistances, and diodes 311, 321, 331, and 341 have substantially the same characteristics.

Assuming that plate 230 is positioned so that the capacitance between plates 230 and 210 is equal to the capacitance between plates 230 and 220, voltages of equal magnitude and 180° phase difference will be present at output terminal 121 and 131. No voltage will be present between output terminals 380 and 390 of demodulating means 300 since, at any time, the voltages at nodes 360 and 370 are equal in amplitude and opposite in phase. If however, plate 230 is adjusted so that capacitance between plates 230 and 210 is less than it was just previously, the capacitance between plate 230 and 220 will be correspondingly greater than it was just previously. The impedance between output terminal 121 and ground will be higher than it was just previously, while the impedance between output terminal 131 and ground will be correspondingly lower than it was just previously. Because of the higher impedance between output terminal 121 and ground, the voltage at output terminal 121 will rise. Because of the lower impedance between output terminal 131 and ground, the voltage at output terminal 131 will decrease. Now, at any time, the voltage at node 360 will have a greater absolute magnitude than the voltage at node 370, although the phase difference between these two voltages will continue to be substantially 180°. A potential difference of constant magnitude and constant polarity will now exist between output terminals 380 and 390 of detecting means 300. This potential difference is the algebraic sum of the amplitudes of the signals at output terminals 121 and 131.

If plate 230 is connected to a rotatable shaft, the magnitude and the polarity of the voltage between output terminals 380 and 390 of the detecting means 300 provides an absolute indication of the position of the rotatable shaft at any time. Since neither output terminal 380 nor output terminal 390 is grounded, the potential difference observed between these two output terminals is free of noise, ripple, or other spurious or extraneous signals.

Figure 2:
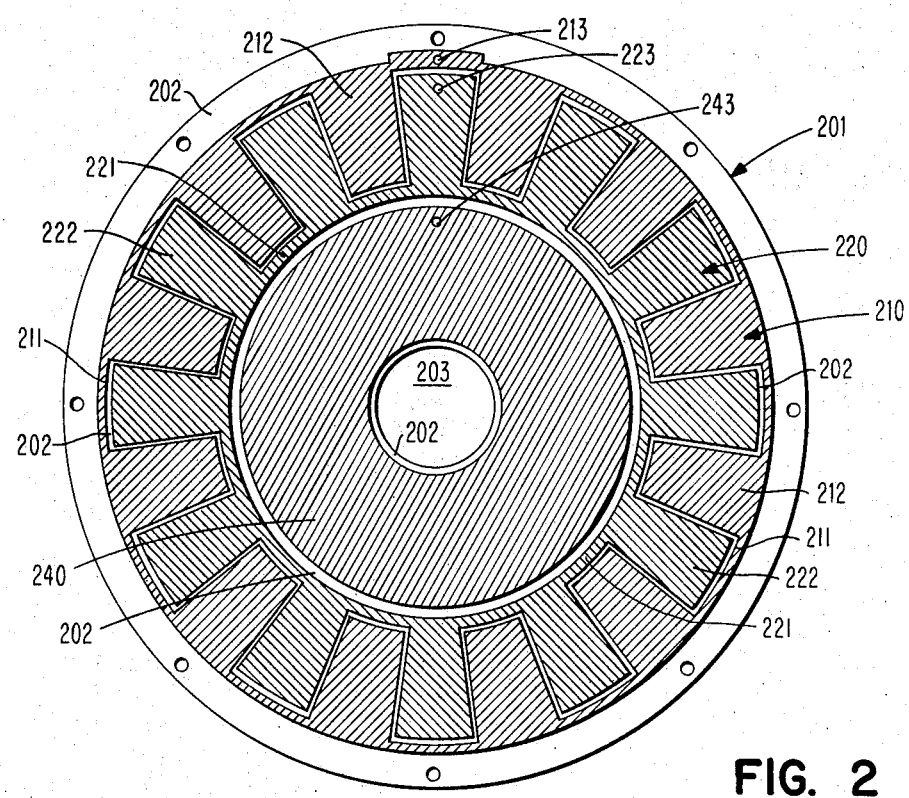
FIG. 2 is a plan view of the stator portion of the preferred embodiment of the differential transducer.
Figure 3:
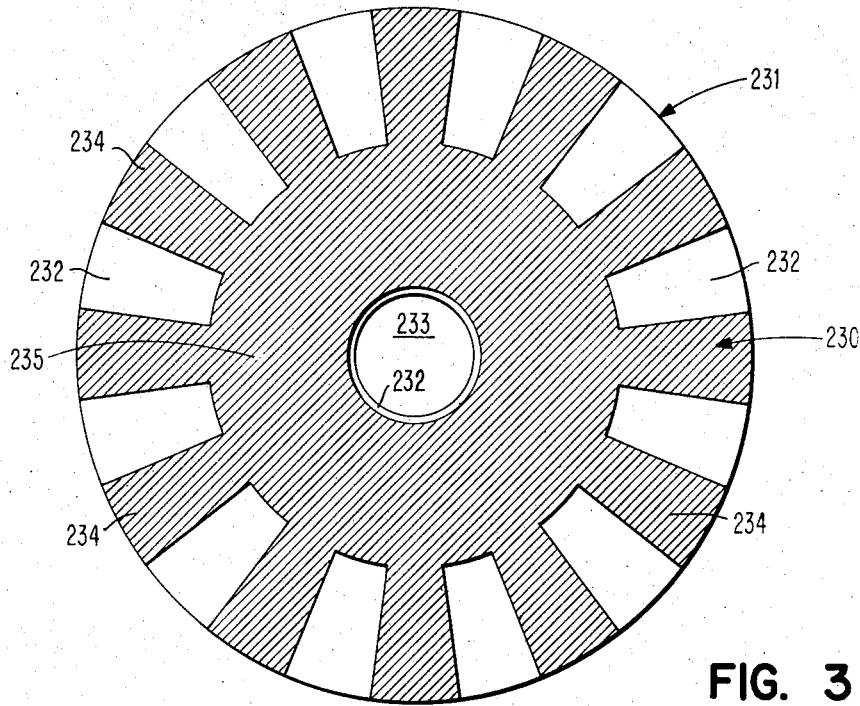
FIG. 3 is a plan view of the rotor portion of the preferred embodiment of the differential capacitive transducer.

FIG. 2 shows the stator portion of differential capacitive transducing means 200, while FIG. 3 shows the cooperating, rotor portion of transducing means 200. In FIG. 2, stator 201 is comprised of a dielectric substrate disc 202 with a center hole 203 and conductive plates 210, 220, and 240. Plate 210 includes a plurality of radially extending conductive bands 212 connected at their outer periphery of conductive annular ring 211. A terminal 213 provides a means for making electrical connection to plate 210. Plate 220 is comprised of a plurality of radially extending conductive bands 222 arranged so that bands 222 alternate with bands 212. Bands 222 are connected at their inner periphery by conductive annular ring 221. Terminal 223 provides a means for making electrical connection with plate 220. Plate 240 is a conductive annular ring disposed on substrate 202. Terminal 243 provides a means for making an electrical connection with plate 240.

Figure 4:
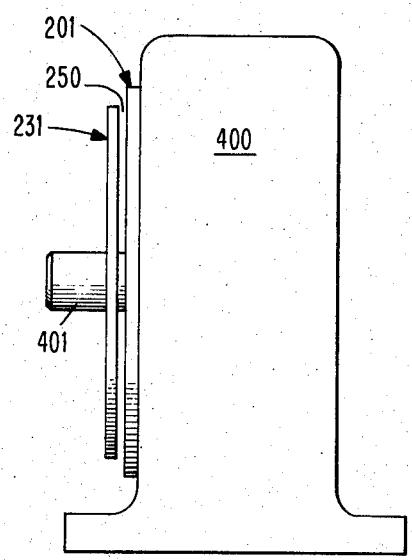
FIG. 4 is an end view of a motor and shows the stator of FIG. 2 mounted on the motor frame and the rotor of FIG. 3 mounted on the motor shaft.

In FIG. 3, rotor 231 is shown comprised of dielectric substrate disc 232 having center hole 233. Plate 230 is disposed on substrate 232 and includes radially extending conductive bands 234 connected at their inner periphery to conductive annular ring 235. In FIG. 4, motor 400 with rotatable shaft 401 is shown. Stator 201 of transducing means 200 is fixedly mounted on motor 400 while rotor 231 of transducing means 200 is mounted substantially parallel to stator 201 on rotatable shaft 401. A small air gap 250 is provided between rotor 231 and stator 201 to eliminate any direct contact between them.

Preferably, the number of conductive bands 212 is equal to the number of conductive bands 222 and also equal to the number of conductive bands 234. It can now be understood that when rotor 231 is rotatably mounted substantially parallel to stator 201, the capacitance between plates 230, 210, and 220 can be made to vary by rotating rotor 231. Rotor 231 may be positioned so that each of bands 234 exactly coincide with bands 212. In this position, the capacitance between plate 230 and plate 210 would be maximum, while the capacitance between plates 230 and 220 would be minimum. Rotor 231 can be rotated until bands 234 equally overlap bands 212 and 222 so that the capacitance between plates 230 and 210 is equal to the capacitance between plates 230 and 220. It will also be observed that the capacitance between ring 235 and plate 240 will remain constant with rotation of rotor 231 so that the capacitance between plates 230 and 240 will remain constant regardless of the position of rotor 231.

The constant capacitance between plates 230 and 240 eliminates the need for plate 230 to be connected to the circuit by slip-rings, or the like. Plate 230, therefore, is capacitively coupled to the circuit by virtue of the constant capacitance between plates 230 and 240. This feature is very advantageous, since many of the problems encountered with prior art capacitive transducers involve the noise introduced by the use of slip-rings or other electrical connecting means.

It can also be seen that if rotor 231 is not exactly parallel to stator 201 an averaging effect will occur, because for every band on the rotor that is closer to the stator than it should be, another band on the rotor will be correspondingly farther away from the stator than it should be. For this reason, the greater the number of bands used on the rotor and stator, the greater is the averaging effect. Also, irregularities introduced during the manufacture of the individual bands will be less apparent when the effect of these irregularities are averaged among a large number of bands.

When differential capacitive transducing means 200 includes rotor 231 and stator 201, a continuous, constant velocity rotation of rotor 231 with respect to stator 201 will produce a substantially triangular waveform at output terminals 380 and 390 of detecting means 300. Twelve periods of this substantially triangular waveform will indicate one complete revolution of rotor 231 when rotor 231 and stator 201 are constructed as shown in FIGS. 2 and 3. If a different number or radial bands comprising plates 230, 210, and 220 are used, a different number of periods will indicate one complete revolution of rotor 231.

The angular velocity of rotor 231 will determine the slope of this substantially triangular waveform. The voltage indicated by the waveform at any time, together with the polarity at that time, will indicate one of a plurality of positions of rotor 231 with respect to stator 201.

Figure 6:
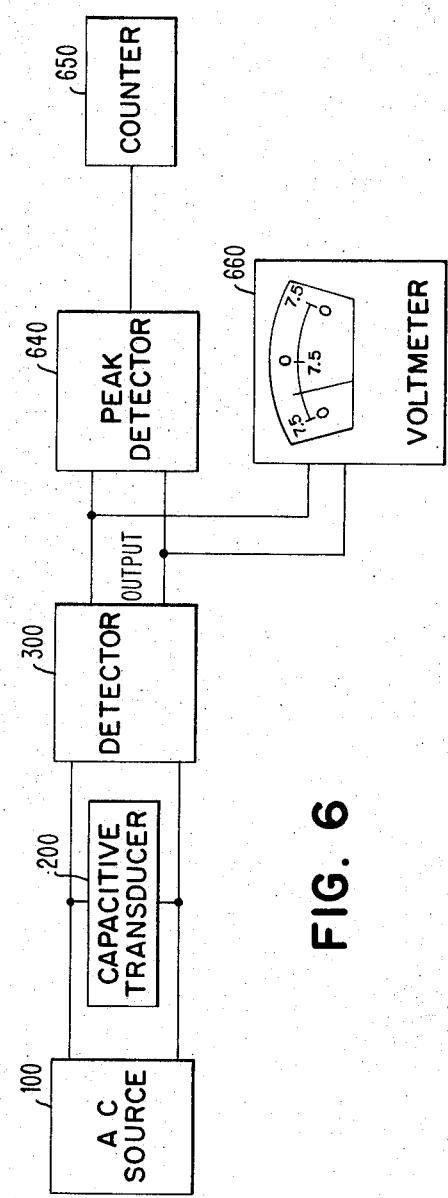
FIG. 6 is a block diagram of a shaft position measuring system which incorporates the sensing device of this invention.

FIG. 6 shows a system for determining exact shaft position, utilizing the apparatus described. Alternating current source means 100, differential capacitive transducing means 200, and detecting means 300 are connected in accordance with the description previously given with respect to FIG. 1. The output of detecting means 300 is connected to peak and zero crossing detector 640. Peak and zero crossing detector 640 increments counter 650 each time a positive or negative peak or a zero crossing is detected in the waveform of the output of detecting means 300. Counter 650 is constructed to reset itself after the number of counts has been reached which indicate one full revolution of rotor 231 with respect to stator 201. Voltage measuring means 660 is also connected to the output of detecting means 300 for indicating the polarity and the magnitude of the waveform at the output of the detecting means 300 at any time. If rotor 231 is to be rotated slowly with respect to stator 201, a simple voltmeter may be used for the voltage measuring means 660. A DC oscilloscope may be used for the voltage measuring means 660 if rotor 231 is to be rotated rapidly with respect to stator 201.

OPERATION

Figure 5:
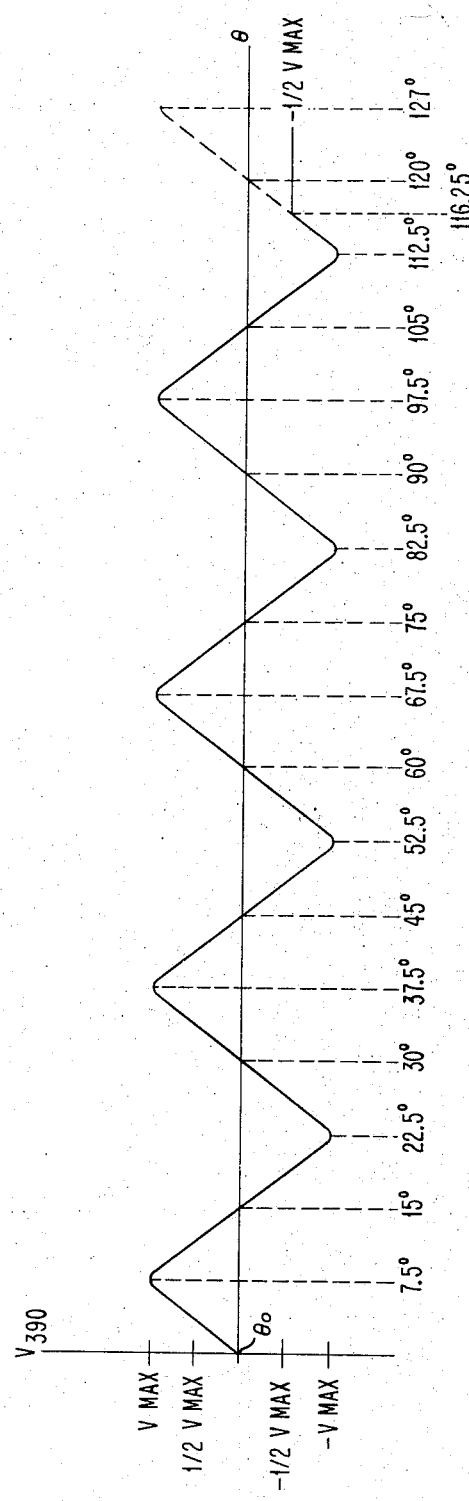
FIG. 5 illustrates a waveform of voltage as a function of shaft position, produced by the sensing device of this invention.

With rotor 231 mounted to motor shaft 401, suppose that it is desirable to rotate motor shaft 401 from a reference point to a point 116.25° in a clockwise direction. Assume now that the reference point has been chosen so that rotor 231 is positioned such that the output of detecting means 300 is zero at output terminals 380 and 390 and that the first clockwise movement of rotor 231 will produce a positive signal at output terminal 390 with respect to output terminal 380. Such a reference point is shown in FIG. 5 on waveform 501 at $\theta_0$.

As motor shaft 401 and rotor 231 begin to rotate in a clockwise direction, a positive peak on waveform 501 indicates that shaft 401 and rotor 231 have progressed 7.5° clockwise from the reference point. This peak will be detected by peak and zero crossing detector 640 and may be indicated on counter 650 by a "1" or by a direct indication of 7.5°. As shaft 401 and rotor 231 continue to rotate, waveform 501 has a magnitude of zero when shaft 401 and rotor 231 have progressed 15° from the reference point $\theta_0$. Hereinafter, such points, (15°, 30°, 45°, 60°, . . .), will be referred to as zero crossings.

The zero crossing at the 15° point of rotation will be detected by peak and zero crossing detector 640 and may be indicated on counter 650 by a "2" or by a direct indication of 15°. As shaft 401 and rotor 231 continue to rotate in a clockwise direction, a negative peak will be detected by peak and zero crossing detector 640 and may be indicated on counter 650 by either a "3" or by a direct indication of 22.5°. Further, as shaft 401 and rotor 231 continue to rotate, a zero crossing will be detected by detector 640 after 30° of rotation and may be indicated on counter 650 by either a "4" or by a direct indication of 30°. Therefore, each time the count on counter 650 is increased by "one," shaft 401 and rotor 231 have progressed an additional 7.5° from the preceding count.

By the time that the 15th count has been indicated, shaft 401 and rotor 231 will have progressed through 112.5° which may be indicated on counter 650 as either a "15" or a direct indication of 112.5°. The position to which it is desired to rotate shaft 401 and rotor 231, 116.25°, occurs after the count indicative of 112.5° and before the next count which, if reached, would indicate a rotation of 120°. It now becomes necessary to utilize the voltage measuring means 660 for indicating the exact location of the 116.25° point.

Waveform 501 in FIG. 5, indicates that the magnitude of waveform 501 is $-V_{max}$ at 112.5° of rotation and that the magnitude of waveform 501 would be zero at 120° rotation. Since 116.25° is halfway between 112.5° and 120°, and since waveform 501 is a substantially triangular waveform, a linear interpolation can be employed to show that the 116.25° point will occur at $-\frac{1}{2}V_{max}$ after the 15th count has been indicated. Thus, when voltage measuring means 660 indicates $-\frac{1}{2}V_{max}$ at the first instance after the 15th count (the count indicative of 112.5° rotation) the 116.25° point will have been reached. If shaft 401 and rotor 231 are instantly stopped at this point, waveform 501 will assume a steady state value of $-\frac{1}{2}V_{max}$. Thus, it is seen that the apparatus produces a non-velocity sensitive signal.

Figure 7:
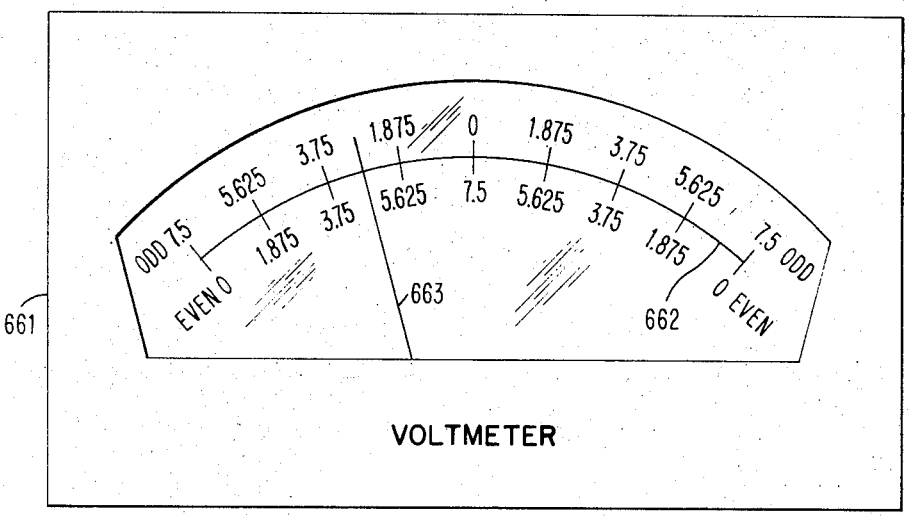
FIG. 7 illustrates an embodiment of a voltage measuring means that may be used in the measuring system shown in FIG. 6.

If shaft 401 and rotor 231 are to be rotated slowly, the voltmeter 661 shown in FIG. 7, may be used for voltage measuring means 660. Scale 662 on voltmeter 661 is calibrated so that it directly indicates a value in degrees which may be added to the data obtained from counter 650. The sum of the value from voltmeter 661 and the data (in degrees) from counter 650 indicates the position of shaft 401. Assuming that needle 663 of voltmeter 661 is at the center of scale 662 while the magnitude of waveform 501 is zero, any movement of needle 663 to the right indicates that waveform 501 is becoming more positive. Any movement of needle 663 to the left indicates that waveform 501 is becoming more negative.

If counter 650 is constructed to indicate the number of counts from the reference point, as well as the number of degrees or rotation to which these counts correspond, a reading from scale 662 can be directly added to the number of degrees also indicated by counter 650 so that the exact shaft position may be determined. The position of needle 663 is determined and if the next count to be indicated by counter 650 is an odd number, the position to which needle 663 is deflected on the "odd" side of scale 662 is added to the number of degrees indicated on counter 650 to determine the shaft position. If the next count to be indicated by counter 650 is an even count, the position to which needle 663 is deflected on the "even" side of scale 662 is added to the number of degrees indicated on counter 650 to determine shaft position.

In the example given above for stopping shaft 401 at the 116.5° position, it was shown that at the 15th count, counter 650 was indicating 112.5°. Rotation of shaft 401 was continued until waveform 501 had a magnitude of $-\frac{1}{2}V_{max}$ after the 15th count of counter 650, but before the 16th count of counter 650. Referring again to FIG. 7, after the 15th count but before the 16th, the "even" side of scale 662 should be observed, since the next count indicated by counter 650 will be the 16th count, an even count. When shaft 401 has been stopped at the 116.25° position, waveform 501 has a polarity and magnitude of $-\frac{1}{2}V_{max}$. When voltmeter 661 is used for voltage measuring means 660, needle 663 will be deflected to a value marked 3.75° on the "even" side of scale 662. This reading of 3.75° is added to the last position indicated on counter 650, 112.5°, which results in the sum of 116.25°, the shaft position with respect to the reference point.

As another example, suppose that at some instant of time, counter 650 indicates a count of "four" and also indicates 30° which is the angular position which corresponds to the count of "four." To determine the exact shaft position at this instant of time, the 30° indicated on counter 650 must be added to the number of degrees indicated on voltmeter 661. Since the last count on counter 650 was "four" the next count on counter 650 will be "five," an odd number. Thus, the "odd" side of scale 662 on voltmeter 661 is observed. Suppose that at this instant of time, needle 663 is deflected to a value of 5.625° on the "odd" side of scale 662. This reading of 5.625° is added to the 30° shown on counter 650 and the sum of 35.625° is the shaft position at this instant of time.

When using the "odd" and "even" sides of scale 662 in this manner, it is recognized that it is immaterial whether the reference point chosen results in the initial change of waveform 501 being more positive (as in the example above) or more negative. For example $\theta_0$ might have been chosen at a point where waveform 501 is zero and where initial clockwise rotation of shaft 401 results in waveform 501 becoming more negative. If the "odd" and "even" sides of scale 662 are used as explained above, the values read from scale 662 can be added to the number of degrees indicated by counter 650 to determine shaft position. It is only necessary that the reference point, $\theta_0$, be chosen to be at a zero crossing of waveform 501 so that the value indicated on scale 662 may be directly added to the position indicated on counter 650 to determine shaft position. Of course, it is also recognized that $\theta_0$ could be chosen at a point other than at a zero crossing of waveform 501, but it would be necessary to algebraically add this displacement to the sum of the position indicated on scale 662 and the position indicated on counter 650.

In stopping shaft 401 at 116.25° in the example above, the slope of waveform 501 becomes particularly useful, since the slope is indicative of the angular velocity of shaft 401. The amount of reverse drive to be applied to motor 400 can be determined by this slope. For example, if the slope is steep the period will be short, which is indicative of a high angular velocity of shaft 401. Thus, in approaching the 116.25° point, a relatively great amount of reverse drive will be needed. If waveform 501 is relatively flat before reaching the 116.25° point, a much smaller amount of reverse drive to motor 400 will be required.

When it is desirable to move a motor through regularly spaced increments, the device may be used for electronic detenting control by causing the motor to stop at a zero crossing of waveform 501. With the rotor and stator shown in FIGS. 2 and 3 respectively, there are 24 zero crossings for each revolution of rotor 231 with respect to stator 201. Thus the motor can be readily caused to stop and start at 24 equal distance increments of each revolution. The zero crossing provides excellent positions to detent since a known detection circuit can be used to sense the zero crossing.

In using this device in a system for electronic detenting, waveform 501 is indicative, not only of the detent (for example, zero crossing) position but also of any other shaft position when the detent position has not been reached. Thus, if the motor shaft is stopped, by error, at a position other than the detent position the magnitude and polarity of waveform 501 is indicative of how far away from the detent position the shaft is, and, therefore, how much drive must be applied to the motor to enable the shaft to reach the detent.

While the invention has been particularly shown and described with reference to a preferred embodiment, it will be understood by those skilled in the art that the foregoing and other changes in form and detail may be made therein without departing from the spirit and scope of the invention.

What is claimed is:

1. A shaft position sensing device comprising:
   alternating current source means having first and second outputs and a reference output for providing first and second signals of equal amplitude and opposite phase when said outputs are connected to loads of the same impedance;
   brushless differential capacitive transducing means having a rotor mounted on said shaft and a stator fixedly mounted parallel to said rotor, said rotor including a first conductive plate insulated from said shaft and said stator including second, third and fourth plates;
   said second plate being connected to said first output of said source means, said third plate being connected to said second output of said source means, and said fourth plate being connected to said reference output of said source means, said capacitive transducing means providing modulation to the amplitudes of said first and second signals concurrent with shaft rotation;
   four arm ring demodulating detecting means having opposing nodes for receiving said modulated first and second signals, and said detecting means having other opposing nodes forming a balanced output for providing a third signal, the amplitude and polarity of said third signal being indicative of shaft position.

2. A system for sensing shaft position, said system comprising:
   alternating current source means having first and second output terminals for providing first and second signals of opposite phase, said first and second signals having equal amplitudes when connected to loads of the same impedance;
   brushless differential capacitive transducing means having a rotor mounted on said shaft and having a stator fixedly mounted substantially parallel to said rotor, said stator being connected to said first and second output terminals of said source means, said transducing means modulating the amplitudes of said first and second signals in a complementary manner;
   ring demodulating detecting means connected to said first and second outputs of said source means, said detecting means having output terminals for providing a demodulated signal, said demodulated signal being equal to the algebraic sum of the amplitudes of said modulated first and second signals;
   peak and zero crossing detecting means for detecting zero crossings and positive and negative peaks of said demodulated signal of said ring demodulating detecting means, said peak and zero crossing detecting means generating a signal each time a zero crossing or a positive or a negative peak of said demodulated signal of said ring demodulating detecting means is detected by said peak and zero crossing detecting means;
   counting means for counting said signals generated by said peak and zero crossing detecting means, said counting means resetting itself after the number of peaks and zero crossings produced by one revolution of said shaft is reached, and;
   voltage measuring means for indicating the polarity and voltage of said demodulated signal of said ring demodulating detecting means;
   said counting means and said voltage measuring means producing data indicative of exact shaft position.

3. The system for sensing shaft position as defined in claim 2 wherein said alternating current source means includes a transformer having primary and secondary windings;
   said primary winding being connected to an alternating current source, and;
   a first end of said secondary winding being connected through a series resistor to said first output terminal of said alternating current source means, and a second end of said secondary winding being connected through another series resistor to said second output terminal of said alternating current source means, both of said series resistors having equal resistances.

4. The system for sensing shaft position as defined in claim 2 wherein said rotor of said brushless differential capacitive transducing means includes:
   a dielectric substrate disc mounted substantially perpendicular to the axis of said shaft, said disc having a plurality of equally spaced radial, conductive bands disposed thereon, all of said bands being electrically connected to a conductive annular ring, said ring being disposed on and concentric with said disc, and;

wherein said stator of said brushless differential capacitive transducing means includes a dielectric substrate disc having a plurality of equally spaced radial conductive bands disposed thereon, with alternating bands being connected to an annular conductive ring at the inner extremities of said alternating bands, and the remaining of said bands being connected to another conductive annular ring at the outer extremities of said remaining bands;

a third conductive annular ring disposed on said stator for providing a constant capacitance with respect to said annular ring on said rotor, said third annular ring on said stator and said annular ring on said rotor enabling brushless operation of said transducing means, and;

a separate terminal connected to each of said rings on said stator.

5. The system for sensing shaft position as defined in claim 2 wherein said ring demodulating detecting means includes a four arm ring demodulator circuit having an input pair of opposing nodes and an output pair of opposing nodes, each of said arms being connected between one of said input pair of opposing nodes and one of said output pair of opposing nodes, each of said arms including a diode in series with a resistor, all of said diodes passing current in the same direction;

said first and second output terminals of said source means being connected to said input pair of opposing nodes, and said output terminals of said ring demodulating detecting means being connected to said output pair of opposing nodes of said four arm ring demodulator circuit.

6. A system for sensing shaft position, said system comprising:

alternating current source means having first and second output terminals;

said alternating current source means including a transformer having primary and secondary windings, said primary windings being connected to an alternating current source, a first end of said secondary winding being connected through a series resistor to said first output terminal of said alternating current source means, and a second end of said secondary winding being connected through another series resistor to said second output terminal of said alternating current source means, both of said series resistors having equal resistances;

said alternating current source means providing first and second signals having equal amplitudes when connected to loads of the same impedance and said first and second signals having opposite phase;

brushless differential capacitive transducing means for amplitude modulating said first and second signals of said source means, said transducing means having a rotor mounted substantially perpendicular to the axis of said shaft, said rotor including a dielectric substrate disc having a plurality of equally spaced radial conductive bands disposed thereon, all of said bands being electrically connected to a conductive annular ring, said ring being disposed on and concentric with said disc;

said capacitive transducing means having a stator fixedly mounted substantially parallel to said rotor, said stator including a dielectric substrate disc having a plurality of equally spaced radial conductive bands disposed thereon, with alternating bands being connected to an annular conductive ring at the inner extremities of said alternating bands and the remaining of said bands being connected to another conductive annular ring at the outer extremities of said remaining bands;

said stator having a third conductive annular ring disposed thereon for providing a constant capacitance with respect to said stator and said annular ring on said rotor enabling brushless operation of said transducing means;

said stator having a terminal connected to said third conductive annular ring, said terminal being connected to a reference terminal on said source means and said stator having separate terminals connected to the other annular rings disposed thereon, said separate terminals being connected to said first and second output terminals of said source means;

ring demodulating detecting means including a four arm ring demodulator circuit having an input pair of opposing nodes and an output pair of opposing nodes, each of said arms being connected between one of said input pair of opposing nodes and one of said output pair of opposing nodes, each of said arms including a diode in series with a resistor, all of said diodes passing current in the same direction;

said first and second output terminals of said source means being connected to said input pair of opposing nodes of said four arm ring demodulator circuit and said output pair of opposing nodes providing a demodulated signal, said demodulated signal being equal to the algebraic sum of the amplitudes of said modulated first and second signals;

peak and zero crossing detecting means for detecting zero crossings and positive and negative peaks of said demodulated signal of said ring demodulating detecting means, said peak and zero crossing detecting means generating a signal each time a zero crossing detecting positive or a negative peak of said demodulated signal of said ring demodulating detecting means is detected by said peak and zero crossing detecting means;

counting means for counting said signals generated by said peak and zero crossing detecting means, said counting means resetting itself after the number of peaks and zero crossings produced by one revolution of said shaft is reached;

voltage measuring means for indicating the polarity and voltage of said demodulated signal of said ring demodulating detecting means;

said counting means and said voltage measuring means providing data indicative of exact shaft position.

* * * * *